United States Patent [19]

Lee

[11] Patent Number: 4,945,865
[45] Date of Patent: Aug. 7, 1990

[54] ENGINE INDUCTION SYSTEM

[75] Inventor: Jordan R. Lee, Sterling Heights, Mich.

[73] Assignee: General Motors Corporation, Detroit, Mich.

[21] Appl. No.: 360,634

[22] Filed: Jun. 2, 1989

[51] Int. Cl.⁵ .............................................. F02M 35/10
[52] U.S. Cl. ................................... 123/52 M; 123/432
[58] Field of Search ............... 123/432, 52 M, 52 MB, 123/52 MC, 52 MV, 308

[56] References Cited

U.S. PATENT DOCUMENTS

| | | | |
|---|---|---|---|
| 3,809,032 | 5/1974 | Morris | 123/52 |
| 3,814,069 | 6/1974 | Croft et al. | 123/52 |
| 4,469,067 | 9/1984 | Futakuchi | 123/432 |
| 4,481,922 | 11/1984 | Sugiura | 123/306 |
| 4,513,698 | 4/1985 | Senga et al. | 123/52 |
| 4,516,538 | 5/1985 | Arakawa et al. | 123/52 |
| 4,612,903 | 9/1986 | Urabe et al. | 123/432 |
| 4,627,400 | 12/1986 | Takata et al. | 123/432 |
| 4,628,879 | 12/1986 | Futakuchi | 123/308 |
| 4,649,876 | 3/1987 | Ohmi et al. | 123/302 |
| 4,726,337 | 2/1988 | Yoshida | 123/52 M |
| 4,726,340 | 2/1988 | Hasegawa et al. | 123/52 M |
| 4,763,612 | 8/1988 | Iwanami | 123/52 MV |
| 4,765,285 | 8/1988 | Kobayashi | 123/52 M |
| 4,766,853 | 8/1988 | Iwanami | 123/52 M |
| 4,809,647 | 3/1989 | Masumoto et al. | 123/52 MB |
| 4,811,697 | 3/1989 | Kurahashi | 123/52 MV |
| 4,834,048 | 5/1989 | Adamis et al. | 123/52 M |

FOREIGN PATENT DOCUMENTS 2202276  9/1988  United Kingdom .......... 123/52 MB

Primary Examiner—David A. Okonsky
Attorney, Agent, or Firm—Gordon F. Belcher

[57] ABSTRACT

An engine induction system for providing air to the cylinders of an engine. The induction system includes a primary plenum and a primary runner leading therefrom to each cylinder. A primary inlet valve is generally adjacent the inlet to the primary plenum. Each of the primary runners is tuned to facilitate cylinder charging at a predetermined lower range of engine speeds. The induction system includes a secondary plenum and a secondary runner leading therefrom to each cylinder. Each of the secondary runners is tuned to facilitate cylinder charging at a predetermined higher range of engine speeds. The induction system includes valves which are operable to close at the predetermined lower range of engine speeds to obstruct air flow into the secondary plenum and the secondary runners, and to open at the predetermined higher range of engine speeds to allow air flow through the secondary plenum and the secondary runners.

13 Claims, 3 Drawing Sheets

ENGINE INDUCTION SYSTEM

TECHNICAL FIELD

This invention relates to an induction system for an engine and, more particularly, to a tuned induction system having separate plenums which separately feed an engine cylinder via separate runners.

BACKGROUND

Engine induction systems are sometimes tuned to facilitate the flow of the air through the induction system into the cylinders of the engine. The improvement in the charging of the cylinders is produced by constructing the components of the induction system so that resonances and momentum increases are created in the air flow at one or more engine speeds. When resonances and momentum increases are created in the air flow in the induction system, the pressure at the cylinder intake ports increases enabling an increased charge of air to enter the cylinders. The improvement in the charging characteristics of the induction system depends on various factors including the size and number of plenums, the number and length of the runners which feed each cylinder, and the circuitry interconnecting the plenums, runners and cylinders.

Tuned induction systems are sometimes constructed with a single plenum which feeds the cylinders of an engine through a single runner extending to each cylinder. A problem associated with such systems is that the engine speeds at which cylinder charging is improved from such tuning are limited. In addition, the large plenum volume, necessary to accommodate the flow through the runners at high engine speeds, reduces the throttle responsiveness and tuning effectiveness at low engine speeds.

Induction systems are also constructed with a single plenum which feeds each cylinder through two or more individual runners. One runner, constituting the primary runner, is tuned for low engine speeds. The other runners, constituting the secondary runners, are tuned for high engine speeds. Valves are located in the secondary runners to obstruct flow through them during low speeds so that the induction system can be tuned at a low engine speed due to the tuning of the primary runners. At higher engine speeds, the valves are opened so that the air flows through the secondary runners in addition to the primary runners. The induction system can thereby be tuned at a higher engine speed due to the tuning of the secondary runners.

Several problems are associated with this type of induction system. First, since there is only a single plenum, it must be sized to accommodate flow through all of the runners at high engine speeds. As discussed above, large plenum volumes reduce the throttle responsiveness and tuning effectiveness at low engine speeds. Second, the air can flow into the secondary runners at low engine speeds, even though the valves in the runners are closed, since only a single valve is located in each runner. If the valves are located in the outlets of the secondary runners, then the secondary runners communicate with the plenum through their inlets and thereby act as extensions of the plenum to increase the effective plenum volume of the induction system. If the valves are located in the inlets of the secondary runners, then the air in the induction system can enter the secondary runners through their outlets as, for example, when the cylinder intake valve is closed, causing resonances in the secondary runners which interfere with the tuning of the primary runners.

Induction systems are sometimes constructed with separate plenums which feed each cylinder through separate runners. The plenums are interconnected so that a single upstream throttle can control air flow into both plenums. One runner, constituting the primary runner, is tuned for low engine speeds and the other runner, constituting the secondary runner, is tuned for high engine speeds. An outlet valve is connected between each pair of primary and secondary runner outlets so that, at low engine speeds, each outlet valve obstructs a secondary runner outlet and, at high engine speeds, each outlet valve obstructs a primary runner outlet.

Several problems are associated with this type of induction system. First, at low engine speeds when the secondary runner outlets are obstructed, the secondary runners and plenum continue to communicate with the primary plenum since the primary and secondary plenums are connected and the secondary runner inlets are unobstructed. This results in the induction system having a larger effective plenum volume which reduces the throttle responsiveness and tuning effectiveness at low engine speeds, as discussed above. Second, since the primary runner is closed at high engine speeds, the secondary plenum and runners must be sufficiently large to accommodate the increased flow associated with high engine speeds and the flow diverted from the primary runners. Closing the primary runners at high engine speeds also prevents the tuning of the primary runners from supplementing the tuning of the secondary runners.

SUMMARY OF THE INVENTION

The present invention provides an engine induction system for providing air to the cylinders of an engine. The induction system includes a primary plenum having a primary inlet enabling air to enter the primary plenum and an outlet port assembly leading to each cylinder. A primary inlet valve is generally adjacent the primary inlet. A primary runner corresponding to each cylinder extends between the primary plenum and the outlet port assembly to provide communication between the primary plenum and a respective cylinder so that air entering into the primary plenum is introduced via each of the primary runners into a respective cylinder. Each of the primary runners is tuned to facilitate cylinder charging at a predetermined lower range of engine speeds. The primary runners do not have any valves therein and the outlet port assembly does not have any valves for controlling the flow through the primary runners.

A secondary plenum having a secondary inlet enables air to enter the secondary plenum. A secondary runner corresponding to each cylinder extends between the secondary plenum and the outlet port assembly to provide communication between the secondary plenum and a respective cylinder so that air entering into the secondary plenum is introduced via each of the secondary runners into a respective cylinder. Each of the secondary runners is tuned to facilitate cylinder charging at a predetermined higher range of engine speeds. The induction system includes a secondary inlet valve generally adjacent the secondary inlet and a secondary outlet valve in the outlet port assembly generally adjacent each of the secondary runners. The secondary inlet valve and each of the secondary outlet valves are operable to close at the predetermined lower range of engine speeds to obstruct air flow into the secondary plenum and the secondary runners and to open at the predetermined higher range of engine speeds to allow air flow through the secondary plenum and the secondary runners.

Provision of air to the engine cylinders at the predetermined lower range of engine speeds is facilitated by closing the secondary inlet and outlet valves to isolate the secondary plenum and runners. Since the secondary plenum is isolated, the effective plenum size of the induction system is smaller at the predetermined lower range of engine speeds where small plenums increase throttle responsiveness and tuning effectiveness. Moreover, since the secondary runner outlets are closed, resonances in the secondary runners which could interfere with the charging enhancements produced by the tuned primary runners at the predetermined lower range of engine speeds are reduced.

Provision of air to the engine cylinders at the predetermined higher range of engine speeds is facilitated by opening the secondary inlet and outlet valves. The addition of the secondary plenum to the induction system results in the system having a larger effective plenum volume necessary to accommodate the larger air flows associated with the predetermined higher range of engine speeds. In addition, the availability of the primary plenum and runners at the predetermined higher range of engine speeds provides a conduit for the air to flow into the cylinders which supplements the secondary plenum and runners thereby reducing the flow capacity requirements of the secondary plenum and runners. Moreover, the primary runners can be tuned to supplement the enhanced cylinder charging produced by the tuned secondary runners to further enhance charging at the predetermined higher range of engine speeds.

These and other features and advantages of the invention will be more fully understood from the following description of certain specific embodiments of the invention taken together with the accompanying drawings.

BRIEF DRAWING DESCRIPTION

In the drawings.

Corresponding reference characters indicate corresponding parts throughout the several views of the drawings.

DETAILED DESCRIPTION

Figure 1:
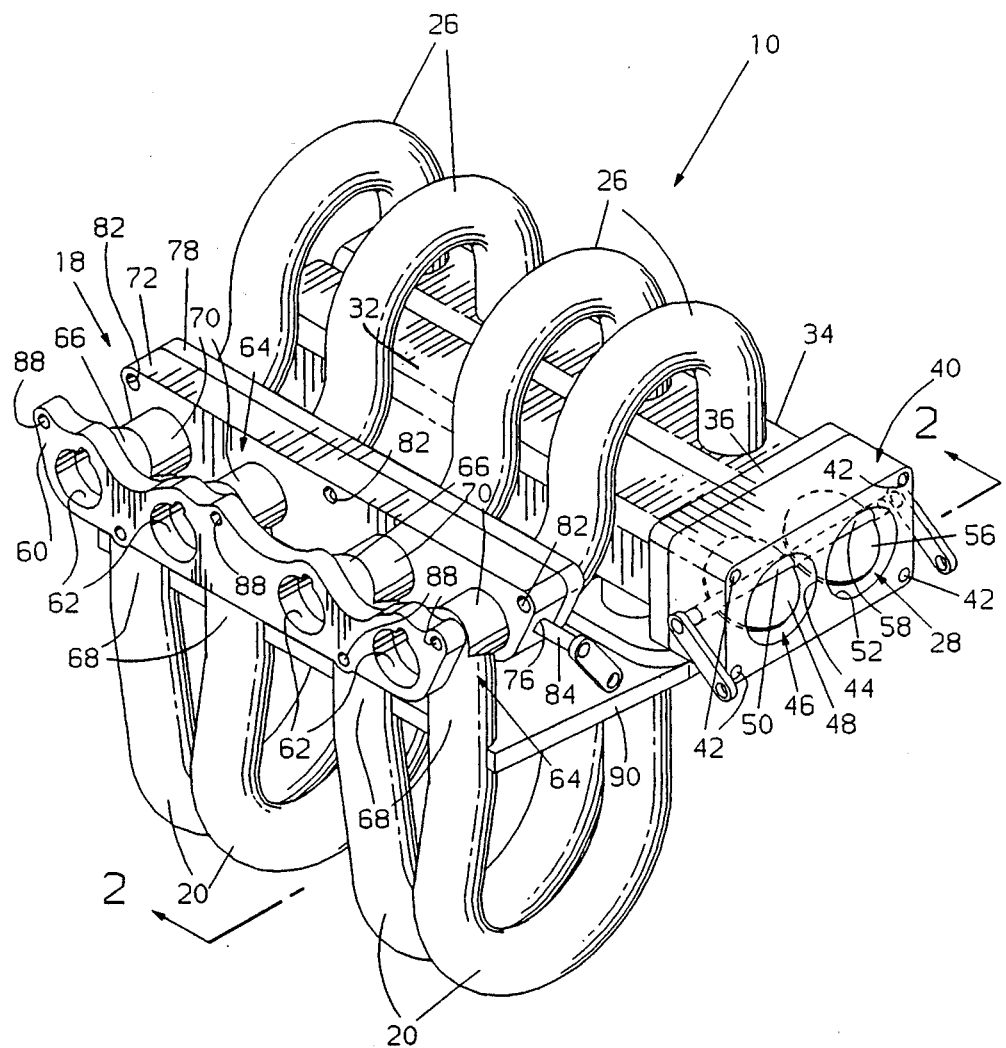
FIG. 1 is a perspective view of an engine induction system of the present invention.
Figure 2:
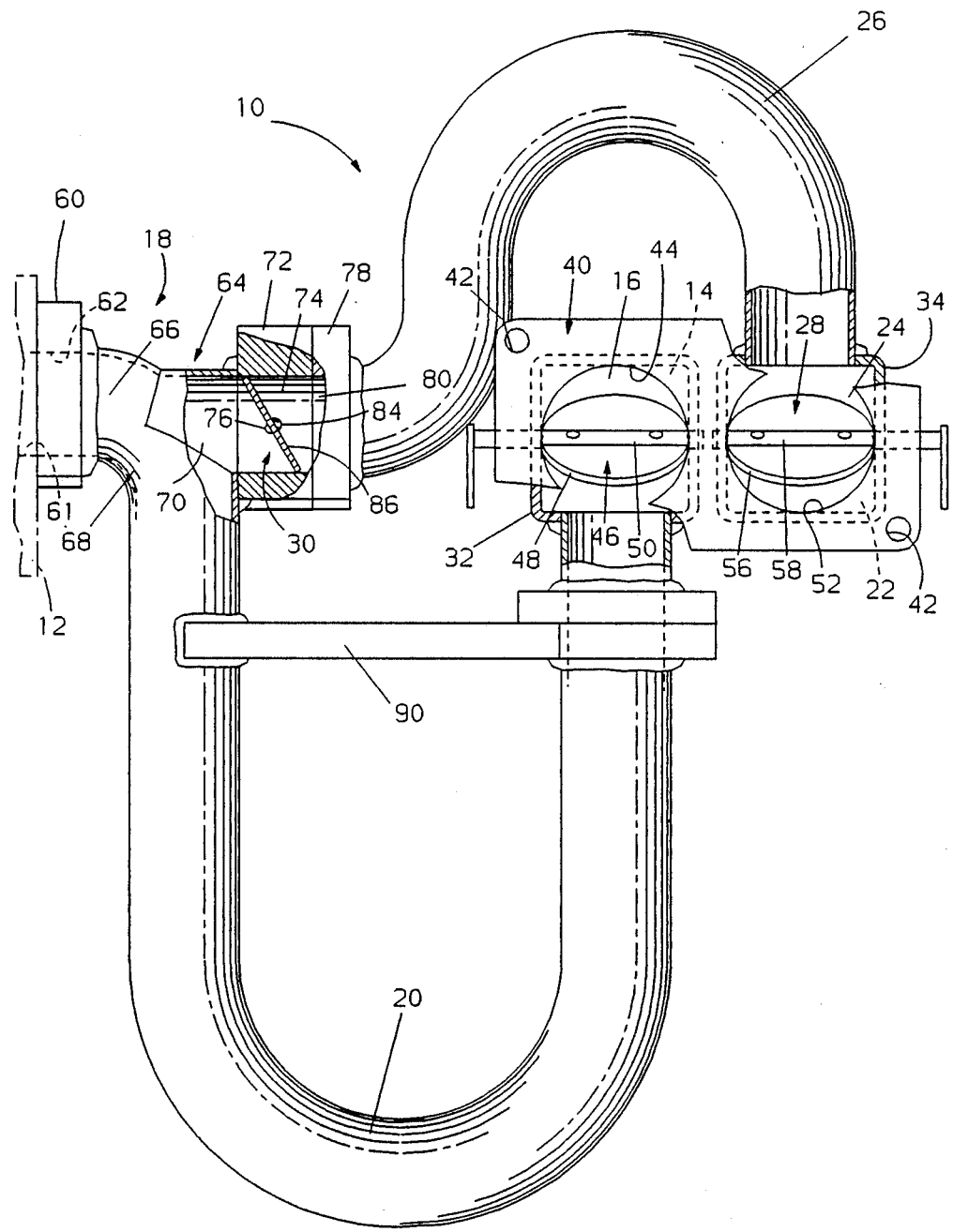
FIG. 2 is an enlarged end elevational view of the engine induction system of FIG. 1 with portions of the throttle body, valve support flange and support shoulder being broken away.

Referring now to the drawings in detail, and in particular, FIGS. 1 and 2, numeral 10 generally indicates an embodiment of the engine induction system of the present invention. The engine induction system is mounted on the cylinder head 12 of an engine for providing air to the cylinders (not shown) of the engine.

Briefly, the engine induction system 10 comprises a primary plenum 14 having a primary inlet 16 enabling air to enter the primary plenum and an outlet port assembly 18 leading to each cylinder. A primary inlet valve 46 is generally adjacent the primary inlet 16. A primary runner 20 corresponding to each cylinder extends between the primary plenum 14 and the outlet port assembly 18 to provide communication between the primary plenum and a respective cylinder so that air entering into the primary plenum is introduced via each of the primary runners into a respective cylinder. Each of the primary runners 20 is tuned to facilitate cylinder charging at a predetermined lower range of engine speeds. The primary runners 20 do not have any valves therein and the outlet port assembly 18 does not have any valves for controlling the flow through the primary runners.

A secondary plenum 22 having a secondary inlet 24 enables air to enter the secondary plenum. A secondary runner 26 corresponding to each cylinder extends between the secondary plenum 22 and the outlet port assembly 18 to provide communication between the secondary plenum and a respective cylinder so that air entering into the secondary plenum is introduced via each of the secondary runners into a respective cylinder. Each of the secondary runners 26 is tuned to facilitate cylinder charging at a predetermined higher range of engine speeds. The induction system 10 includes a secondary inlet valve 28 generally adjacent said secondary inlet 24 and a secondary outlet valve 30 in the outlet port assembly 18 generally adjacent each of the secondary runners 26. The secondary inlet valve 28 and each of the secondary outlet valves 30 are operable to close at the predetermined lower range of engine speeds to obstruct air flow into the secondary plenum 22 and the secondary runners 26 and to open at the predetermined higher range of engine speeds to allow air flow through the secondary plenum and the secondary runners.

More specifically, the primary plenum 14 is constituted by a chamber in a primary manifold 32 having a rectangular cross section. The primary inlet 16 is formed by an opening in one end of the primary manifold 32 with the opposite end of the manifold being closed. The primary plenum 14 is sized so that its capacity is suitable for the lower air flows associated with the predetermined lower range of engine speeds.

The secondary plenum 22 is constituted by a chamber in a secondary manifold 34 having a rectangular cross section. The secondary inlet 24 is formed by an opening in one end of the secondary manifold 34 with the opposite end of the manifold being closed. The secondary plenum 22 is sized so that its capacity is suitable for the higher air flows associated with the predetermined higher range of engine speeds.

A throttle support flange 36 is attached to the open ends of the primary and secondary manifolds 32, 34. The throttle support flange 36 has an opening which registers with the primary inlet 16 and an opening which registers with the secondary inlet 24. A throttle body 40 is secured to the outer face of the throttle support flange 36 by bolts (not shown) which extend through connecting bores 42 in the throttle body 40 and throttle support flange 36.

The throttle body 40 has a primary passage 44 which registers with the primary inlet 16. The primary inlet valve 46 is mounted in the primary passage 44. The primary inlet valve 46 comprises a butterfly-type valve including a circular throttle plate 48 which pivots on a shaft 50 adjacent the primary inlet 16. The throttle body 40 also has a secondary passage 52 which registers with the secondary inlet 24 with the secondary inlet valve 28 being mounted in the passage. The secondary inlet valve 28 comprises a butterfly-type valve including a circular throttle plate 56 which pivots on a shaft 58 adjacent the secondary inlet 24. A conventional actuating mechanism (not shown) is coupled to the shaft 50 to adjust the inclination of the throttle plate 48 with respect to the primary inlet 16 to regulate the air flow into the primary plenum 14. A similar actuating mechanism (not shown) is coupled to the secondary inlet valve 28 to regulate the air flow into the secondary plenum 22. The actuating mechanisms are independently controlled so that the flow into the primary and secondary plenums 14, 22 can be independently regulated.

In an alternative embodiment (not shown), separate support flanges are attached to the open ends of the primary and secondary manifolds 32, 34. A single throttle body similar to the throttle body 40 may be connected to the support flanges. Alternatively, separate throttle bodies each having a valve therein may be connected to each support flange to regulate the air flow into the respective plenums 14, 22.

Each primary runner 20 comprises a generally U-shaped metallic tube having a generally circular cross section. One end of each primary runner 20 is connected to the primary manifold 32 so that it registers with an opening in the lower face of the manifold. Tuning of the primary runners 20 is accomplished by any of the conventional methods which entail sizing the length and cross section dimensions of the tubes so that resonances and momentum increases are created in the runners which facilitate cylinder charging at the predetermined lower range of engine speeds. The primary runners 20 are also tuned to supplement the charging enhancements produced by the secondary runners 26 at the predetermined higher range of engine speeds. Each primary runner 20 is sized so that its capacity is suitable for the lower air flows associated with the predetermined lower range of engine speeds.

Each secondary runner 26 comprises a generally U-shaped metallic tube having a generally circular cross section. One end of each secondary runner 26 is connected to the secondary manifold 34 so that it registers with an opening in the upper face of the manifold. Tuning of the secondary runners 26 is accomplished by any of the conventional methods which entail sizing the length and cross section dimensions of the tubes so that resonances and momentum increases are created in the runners which facilitate cylinder charging at the predetermined higher range of engine speeds. This ordinarily results in the lengths of the secondary runners 26 being less than the lengths of the primary runners 20. Each secondary runner 26 is sized so that its capacity is suitable for the higher air flows associated with the predetermined higher range of engine speeds.

The outlet port assembly 18 includes a mounting flange 60 which mates with the outer surface of the cylinder head 12 as shown in FIG. 2. The mounting flange 60 has an outlet port 62 comprising an opening corresponding to each intake passage 61 in the cylinder head 12 which leads to a cylinder. The outlet ports 62 are spaced so that, when the mounting flange 60 is attached to the cylinder head 12, each outlet port 62 registers with an intake passage 61.

The outlet port assembly 18 includes a Y-type port fitting 64 extending from each outlet port 62 away from the cylinder head 12. Each port fitting 64 has a common outlet branch 66 registering with an outlet port 62. Each common outlet branch 66 divides into a primary branch 68 and a secondary branch 70.

The end of each primary runner 20 opposite the primary manifold 32 is connected to a respective primary branch 68 so that the primary branch registers with the respective runner. A two-piece support bracket 90 extends between opposite legs of the primary runners 20 as shown in FIG. 2 to provide support to the runners.

The outlet port assembly 18 includes a valve support flange 72 into which each secondary branch 70 extends. A series of coaxial valve bores 76 extends through the valve support flange 72 between the secondary branches 70 generally midway between the top and bottom of the passages for supporting the secondary outlet valves 30.

The end of each secondary runner 26 opposite the secondary manifold 34 is connected to a support shoulder 78 so that each runner registers with an opening in the shoulder. The support shoulder 78 is secured to the valve support flange 72 by bolts (not shown) which extend through connecting bores 82 in the shoulder and support flange. The connection of the support shoulder 78 to the valve support flange 72 results in each secondary runner 26 registering with a respective valve passage 74 as shown in FIG. 2. Communication is thereby provided between the primary and secondary plenums 14, 22 and the cylinders via the primary and secondary runners 20, 26, respectively.

Each secondary outlet valve 30 comprises a butterfly-type valve having a shaft 84 pivotably supporting a circular plate 86 disposed in each secondary branch 70. The shaft 84 extends through the valve bores 76 which act as support bearings for the shaft. A conventional actuating mechanism (not shown) is coupled to the shaft 84 to adjust the inclination of the plates 86 with respect to the secondary branches 70 to regulate the air flow out of the secondary runners 26 and any back flow from the cylinders into the secondary runners 26. The mounting flange 60 is secured to the cylinder head 12 by bolts (not shown) which extend through connecting bores 88 in the flange.

The induction system 10 shown in FIG. 1 can be used with cylinders having a single intake port or multiple intake ports. If the cylinders have a single intake port (not shown), then the induction system 10 shown in FIG. 1 can be used with each common outlet branch 66 registering with an intake passage 61 in the cylinder head 12 which leads directly to a cylinder intake port.

Figure 3:
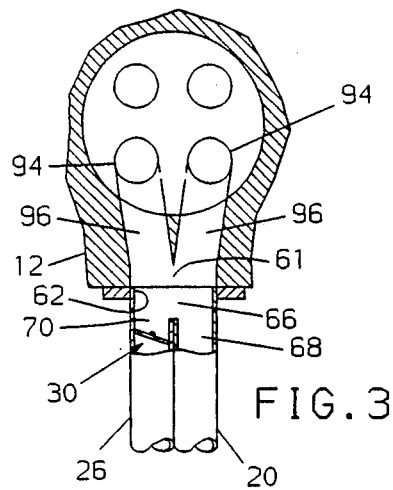
FIG. 3 is a schematic diagram illustrating the connection of the engine induction system of FIG. 1 to an engine having a cylinder with two intake ports.
Figure 4:
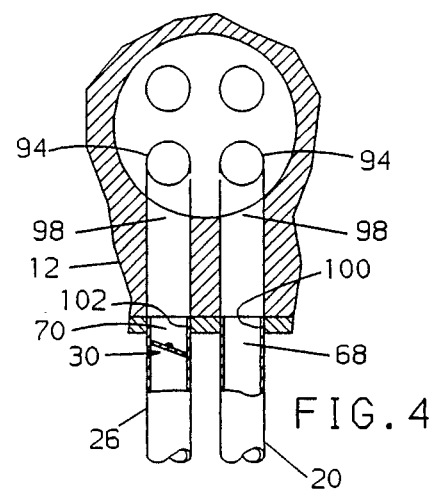
FIG. 4 is a schematic diagram of a second embodiment of an engine induction system of the present invention illustrating the connection of the induction system to an engine having a cylinder with two intake ports.

If the cylinders have two intake ports, indicated by reference numerals 94 in FIGS. 3 and 4, two intake passage configurations are possible. In one arrangement, shown in FIG. 3, each intake passage 61 divides in the cylinder head 12 into two separate branch intake passages 96 with each branch intake passage extending to a separate cylinder intake port 94. The induction system 10 shown in FIG. 1 can be used with such an intake passage configuration since the division of the intake passage occurs downstream of the outlet ports 62.

Alternatively, the cylinder head 12 may have separate intake passages 98 extending from the outer surface of the head to each cylinder intake port 94 as shown in FIG. 4. The induction system 10 shown in FIG. 1 can be modified for use with such a cylinder head by replacing the outlet ports 62 and common outlet branches 66 with primary outlet ports 100 and secondary outlet ports 102 comprising openings which register directly with the respective primary and secondary branches 68, 70. The primary and secondary runners 20, 26 are thereby able to communicate directly with the respective intake passages 98.

Figure 5:
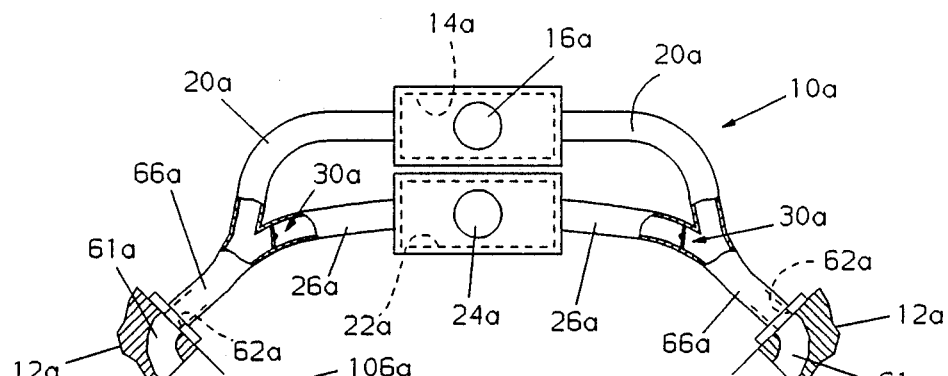
FIG. 5 is a schematic diagram of a third embodiment of the engine induction system of the present invention mounted on a V-type engine.
Figure 6:
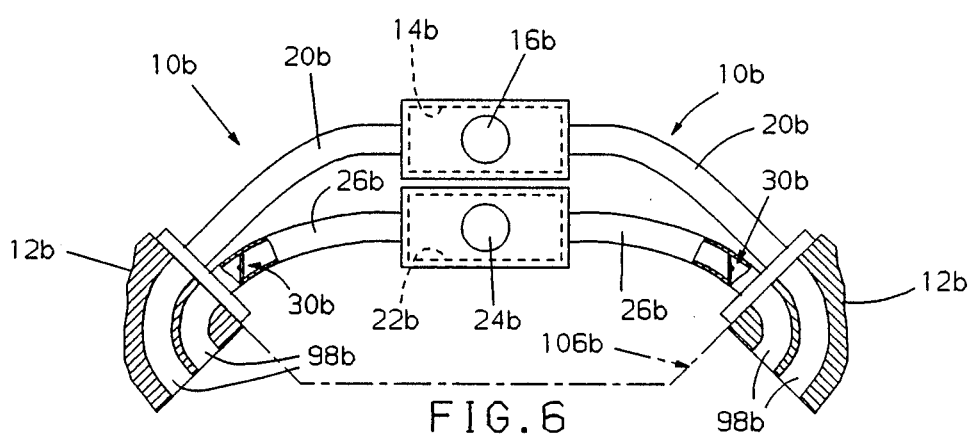
FIG. 6 is a schematic diagram of a fourth embodiment of the engine induction system of the present invention mounted on a V-type engine having a cylinder with two intake ports.

Alternative induction systems indicated generally by numerals 10a and 10b in FIGS. 5 and 6, respectively, can be constructed in accordance with the principles of the invention for use with V-type engines 106a, 106b. Similar parts are identified by the same reference numerals with the addition of the suffixes a and b for the respective embodiments. The induction system 10a, illustrated in FIG. 5, can be used with cylinders having a single intake port or multiple intake ports (not shown), assuming each intake passage 61a divides in the cylinder head 12a downstream of the outlet ports 62a. The induction system 10b, illustrated in FIG. 6, can be used with a cylinder head 12b having separate intake passages 98b extending to separate intake ports (not shown). The induction system 10b is modified so that each intake passage 98b communicates individually with a primary or secondary runner 20b, 26b, as shown in FIG. 6.

Referring now to FIGS. 1 and 2, in operation, when the engine is running at the predetermined lower range of speeds, the respective valve actuating mechanisms cause the secondary inlet valve 28 and secondary outlet valves 30 to close. This results in the air flow entering the cylinders via the primary plenum 14 and the primary runners 20 which are tuned for the predetermined lower range of engine speeds. The valve actuating mechanism can adjust the primary inlet valve 46 to regulate the air flow into the primary plenum 14 and primary runners 20. Since the secondary plenum 22 is bypassed, the effective plenum size of the induction system 10 is reduced, thereby increasing throttle responsiveness and tuning effectiveness. Bypassing the secondary runner 26, which is tuned for the predetermined higher range of engine speeds, also reduces any tuning interference produced by the secondary runner in the primary runner 20. Closing the secondary outlet valves 30 reduces any backflow of air into the secondary runners 26 from the intake passage 61 as could occur, for example, when the cylinder intake valve (not shown) is closed. Such backflow can produce resonances which interfere with the tuning of the primary runners 20.

At the predetermined higher range of engine speeds, the secondary inlet valve 28 and secondary outlet valves 30 are opened to allow the air to enter the cylinders via the secondary plenum 22 and secondary runners 26 in addition to the primary plenum and runners 14, 20. Cylinder charging is thereby enhanced since the secondary runners 26 are tuned for the predetermined higher range of engine speeds. The effective plenum size of the induction system 10 also increases, resulting in more effective tuning and a larger flow capacity which is necessary to accommodate the higher air flows produced at the predetermined higher range of engine speeds. Allowing flow to continue through the primary plenum and runners 14, 20 provides an additional conduit for the air to flow to the cylinders reducing the flow capacity requirements of the secondary plenum 22 and secondary runners 26. Allowing flow to continue through the primary runners 20 also enables the runners to supplement the charging enhancements produced by the tuned secondary runners 26. The valve actuating mechanisms can adjust the secondary inlet and outlet valves 28, 30 and the primary inlet valve 46 to regulate the air flow through the two sets of plenums 14, 22 and runners 20, 26.

If the cylinder port configuration shown in FIG. 4 is used, the timing of the secondary intake poppet valves can be adjusted to further improve the charging enhancements produced by the tuning of the secondary runners 26. Since the primary and secondary runners 20, 26 individually register with separate intake passages 98, such adjustment in the valve timing has limited effect on the tuning of the primary runners. This can improve the combined charging effectiveness of the primary and secondary runners 20, 26 since the optimum valve timing for the separate runners can be different.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

I claim:

1. An engine induction system for providing air to the cylinders of an engine comprising:
    a primary plenum having a primary inlet enabling air to enter said primary plenum;
    a primary inlet valve generally adjacent said primary inlet;
    an outlet port assembly leading to each cylinder;
    a primary runner corresponding to each cylinder extending between said primary plenum and said outlet port assembly to provide communication between said primary plenum and a respective cylinder so that air entering into said primary plenum is introduced via each of said primary runners into a respective cylinder, each of said primary runners being tuned to facilitate cylinder charging at a predetermined lower range of engine speeds, said primary runners not having any control valves therein and said outlet port assembly not having any control valves for controlling the flow through said primary runners;
    a secondary plenum having a secondary inlet enabling air to enter said secondary plenum;
    a secondary inlet valve generally adjacent said secondary inlet;
    a secondary runner corresponding to each cylinder extending between said secondary plenum and said outlet port assembly to provide communication between said secondary plenum and a respective cylinder so that air entering into said secondary plenum is introduced via each of said secondary runners into a respective cylinder, each of said secondary runners being tuned to facilitate cylinder charging at a predetermined higher range of engine speeds; and a secondary outlet valve in said outlet port assembly generally adjacent each of said secondary runners, said secondary inlet valve and each of said secondary outlet valves being operable to close at said predetermined lower range of engine speeds to obstruct air flow into said secondary plenum and said secondary runners and to open at said predetermined higher range of engine speeds to allow air flow through said secondary plenum and said secondary runners.

2. An engine induction system as set forth in claim 1 and further comprising a primary inlet valve generally adjacent said primary inlet.

3. An engine induction system as set forth in claim 2 wherein said primary inlet valve includes a butterfly-type valve.

4. An engine induction system as set forth in claim 1 wherein said secondary inlet valve includes a butterfly-type valve.

5. An engine induction system as set forth in claim 1 wherein each of said secondary outlet valves includes a butterfly-type valve.

6. An engine induction system as set forth in claim 1 wherein the length of each of said primary runners is greater than the length of each of said secondary runners to facilitate said tuning.

7. An engine induction system as set forth in claim 1 wherein said outlet port assembly includes an outlet port leading to each cylinder, each of said outlet ports being fed by one of said primary runners and one of said secondary runners.

8. An engine induction system as set forth in claim 1 wherein each cylinder has multiple intake ports and said outlet port assembly comprises a primary branch leading to one intake port of each cylinder, each of said primary branches being fed solely by one of said primary runners, and a secondary branch leading to another intake port of each cylinder, each of said secondary branches being fed solely by one of said secondary runners.

9. An engine induction system for providing air to the cylinders of an engine comprising:
  a primary plenum having a primary inlet enabling air to enter said primary plenum;
  a primary inlet valve generally adjacent said primary inlet;
  an outlet port assembly having a common outlet branch leading to each cylinder, a primary branch leading to each of said common outlet branches, and a secondary branch leading to each of said common outlet branches;
  a primary runner corresponding to each cylinder extending between said primary plenum and said outlet port assembly, each of said primary runners feeding one of said primary branches so that air entering into said primary plenum is introduced via said primary runners into the cylinders, said primary runners being tuned to facilitate cylinder charging at a predetermined lower range of engine speeds;
  a secondary plenum having a secondary inlet enabling air to enter said secondary plenum;
  a secondary inlet valve generally adjacent said secondary inlet;
  a secondary runner corresponding to each cylinder extending between said secondary plenum and said outlet port assembly, each of said secondary runners feeding one of said secondary branches so that air entering into said secondary plenum is introduced via said secondary runners into the cylinders, said secondary runners being tuned to facilitate cylinder charging at a predetermined higher range of engine speeds; and
  a secondary outlet valve located in each of said secondary branches immediately adjacent said common outlet branches, said secondary inlet and outlet valves being operable to close at said predetermined lower range of engine speeds to obstruct air flow into said secondary plenum, secondary runners and the portions of said secondary branches upstream of said secondary outlet valves, said secondary inlet and outlet valves being further operable to open at said predetermined higher range of engine speeds to allow air flow through said secondary plenum, secondary runners and secondary branches.

10. An engine induction system as set forth in claim 9 wherein the lengths of said primary runners are greater than the lengths of said secondary runners to facilitate said tuning.

11. An engine induction system for providing air to the cylinders of an engine, each cylinder having multiple intake ports, the engine induction system comprising:
  a primary plenum having a primary inlet enabling air to enter said primary plenum;
  a primary inlet valve generally adjacent said primary inlet;
  an outlet port assembly having a primary branch leading to one intake port of each cylinder and a secondary branch leading to another intake port of each cylinder;
  a primary runner corresponding to each cylinder extending between said primary plenum and said outlet port assembly, each of said primary branches being fed solely by one of said primary runners so that air entering into said primary plenum is introduced via said primary runners into the cylinders, said primary runners being tuned to facilitate cylinder charging at a predetermined lower range of engine speeds;
  a secondary plenum having a secondary inlet enabling air to enter said secondary plenum;
  a secondary inlet valve generally adjacent said secondary inlet;
  a secondary runner corresponding to each cylinder extending between said secondary plenum and said outlet port assembly, each of said secondary branches being fed solely by one of said secondary runners so that air entering into said secondary plenum is introduced via said secondary runners into the cylinders, said secondary runners being tuned to facilitate cylinder charging at a predetermined higher range of engine speeds; and
  a secondary outlet valve in each of said secondary branches, said secondary inlet and outlet valves being operable to close at said predetermined lower range of engine speeds to obstruct air flow into said secondary plenum, secondary runners and any portions of said secondary branches upstream of said secondary outlet valves, said secondary inlet and outlet valves being further operable to open at said predetermined higher range of engine speeds to allow air flow through said secondary plenum, secondary runners and secondary branches.

12. An engine induction system as set forth in claim 11 wherein said secondary outlet valves are located in said secondary branches so that any portions of said secondary branches downstream of said secondary outlet valves are substantially smaller than said primary runners.

13. An engine induction system as set forth in claim 11 wherein the lengths of said primary runners are greater than the lengths of said secondary runners to facilitate said tuning.

* * * * *